United States Patent
Kalman et al.

(10) Patent No.: US 7,702,948 B1
(45) Date of Patent: Apr. 20, 2010

(54) AUTO-CONFIGURATION OF RAID SYSTEMS

(75) Inventors: Dean Kalman, Cary, NC (US); Clinton D. Knight, Apex, NC (US)

(73) Assignee: Adaptec, Inc., Milpitas, CA (US)

( * ) Notice: Subject to any disclaimer, the term of this patent is extended or adjusted under 35 U.S.C. 154(b) by 1320 days.

(21) Appl. No.: 10/889,006

(22) Filed: Jul. 13, 2004

(51) Int. Cl.
*G06F 11/00* (2006.01)

(52) U.S. Cl. ............................... 714/5; 714/6

(58) Field of Classification Search ............ 714/5, 714/6, 7, 8; 711/170
See application file for complete search history.

(56) References Cited

U.S. PATENT DOCUMENTS

| | | | | |
|---|---|---|---|---|
| 5,430,855 A * | 7/1995 | Walsh et al. | ............. | 710/10 |
| 5,613,059 A * | 3/1997 | Stallmo et al. | ............. | 714/6 |
| 5,659,704 A * | 8/1997 | Burkes et al. | ............. | 711/114 |
| 5,960,169 A | 9/1999 | Styczinski | | |
| 6,058,454 A * | 5/2000 | Gerlach et al. | ............. | 711/114 |
| 6,076,142 A * | 6/2000 | Corrington et al. | ............. | 711/114 |
| 6,078,990 A * | 6/2000 | Frazier | ............. | 711/114 |
| 6,088,778 A * | 7/2000 | Ruff et al. | ............. | 711/173 |
| 6,098,119 A | 8/2000 | Surugucchi et al. | | |
| 6,282,670 B1 | 8/2001 | Rezaul Islam et al. | | |
| 6,332,197 B1 * | 12/2001 | Jadav et al. | ............. | 714/6 |
| 6,346,954 B1 | 2/2002 | Chu et al. | | |
| 6,519,679 B2 * | 2/2003 | Devireddy et al. | ............. | 711/114 |
| 6,530,035 B1 * | 3/2003 | Bridge | ............. | 714/6 |
| 6,678,768 B1 | 1/2004 | Craft | | |
| 6,754,767 B2 * | 6/2004 | Gold | ............. | 711/114 |
| 6,807,605 B2 * | 10/2004 | Umberger et al. | ............. | 711/114 |
| 6,839,827 B1 * | 1/2005 | Beardsley et al. | ............. | 711/206 |
| 6,845,465 B2 * | 1/2005 | Hashemi | ............. | 714/6 |
| 6,952,794 B2 * | 10/2005 | Lu | ............. | 714/7 |
| 6,996,743 B2 * | 2/2006 | Knapp, III | ............. | 714/6 |
| 7,107,534 B1 * | 9/2006 | de Jong et al. | ............. | 715/734 |
| 7,263,582 B2 * | 8/2007 | Vasudevan et al. | ............. | 711/114 |
| 7,313,719 B1 * | 12/2007 | Elahee | ............. | 714/6 |
| 2003/0041211 A1 * | 2/2003 | Merkey et al. | ............. | 711/114 |
| 2003/0074527 A1 * | 4/2003 | Burton et al. | ............. | 711/114 |
| 2004/0019822 A1 * | 1/2004 | Knapp, III | ............. | 714/6 |
| 2004/0073747 A1 * | 4/2004 | Lu | ............. | 711/114 |
| 2005/0010920 A1 * | 1/2005 | Lin et al. | ............. | 717/176 |
| 2005/0108474 A1 * | 5/2005 | Zhang et al. | ............. | 711/114 |

* cited by examiner

*Primary Examiner*—Robert Beausoliel
*Assistant Examiner*—Elmira Mehrmanesh
(74) *Attorney, Agent, or Firm*—Fish & Richardson P.C.

(57) ABSTRACT

A computer-implemented method of automatically configuring a platform of storage devices includes querying components of the platform to gather information about the capability of the platform, locating one or more storage devices within the platform, automatically determining one or more RAID levels that are supported by the platform, and automatically configuring one or more storage devices within the platform as a RAID system having a particular RAID level, where the particular RAID level is selected based on the capability of the platform.

22 Claims, 5 Drawing Sheets

AUTO-CONFIGURATION OF RAID SYSTEMS

TECHNICAL FIELD

This invention relates to RAID "redundant array of inexpensive (or independent) disks" systems, and more particularly to auto-configuration of RAID systems.

BACKGROUND

A RAID system creates one or more pools of data storage space from several physical storage devices. RAID systems can use a variety of different techniques for allocating data among disks of the array, where the different techniques are commonly identified by a RAID level. Different RAID levels each have different requirements and capabilities.

RAID level 0 provides striping of data, meaning that a large data block is broken into smaller pieces and written in an interleaved manner onto multiple disks. RAID level 0 boosts performance for high-bandwidth operations, but does not provide any fault tolerance because it does not offer data redundancy.

RAID level 1 provides fault tolerance by mirroring data on two or more disks. RAID level 1 is relatively expensive because, when compared with non-mirrored storage space, it requires storage space in quantities that are at least twice the quantity of data to be written.

RAID level 10 (also known as RAID 0/1) is a combination of RAID levels 0 and 1, in which a RAID level 0 stripe set of data is created across a two disk array and a duplicate of the first stripe set is then mirrored on another two disk array for fault tolerance. This configuration provides the performance benefits of RAID level 0 and the redundancy of RAID level 1, but is costly because at least four disks are necessary to create a RAID 10 configuration.

RAID level 2 uses Hamming Error Correcting Codes to achieve fault tolerance and parallel access for input/output operations. In RAID level 2, bytes of data are striped across an array of disks, which allows very high data transfer rates when accessing large quantities of data, but may provide unacceptable performance for read/write operations for smaller data blocks. RAID level 2 also requires one check disk for each data disk to detect and correct any errors. For these reasons, RAID level 2 is not commonly used.

RAID level 3 essentially provides a fault tolerant version of RAID level 0 that trades some data storage capacity to provide fault tolerance. In RAID level 3, data are striped in bytes across a plurality of disks, while at least one disk is reserved to store parity information. The parity data are used to maintain data integrity across all drives in the RAID system. RAID level 3 achieves high data transfer rates by reading from or writing to multiple drives in parallel while providing the ability to reconstruct data if a single drive fails.

RAID level 4 is similar to RAID level 3 in that it stripes data across different disks and reserves a disk for parity data, except that data are striped across multiple disks in sectors rather than in bytes. Thus, RAID level 4 is efficient for high input/output transactions.

However, as with RAID level 3, an inherent bottleneck exists with RAID level 4 at the parity disk because parity encoding on the parity disk is required whenever data are written to the disk array.

RAID level 5 is similar to RAID level 4 in that it stripes data across different disks in sectors. However, RAID level 5 avoids the inherent bottleneck of RAID level 4 by also striping the parity data across disks of the array. Although RAID level 5 provides fast data throughput, performance is sacrificed for data rebuilds or reading data from an array with a failed disk because of parity striping.

RAID level 6 is similar to RAID level 5, except that it uses a second level of independently calculated and distributed parity information for additional fault tolerance, which provides additional security in the event that two drives fail.

RAID level 50 (also known as RAID 0/5) is a combination of RAID level 0 and RAID level 5. Multiple RAID level 5 arrays are striped together using a RAID level 0 configuration. Parity is maintained separately for each RAID level 5 group within the striped array. The configuration provides the advantages of RAID level 5 for small data transfers with the added performance of striping for read/write operations.

SUMMARY

In a general aspect, a computer-implemented method of automatically configuring a platform of storage devices includes querying components of the platform to gather information about the capability of the platform, locating one or more storage devices within the platform, automatically determining one or more RAID levels that are supported by the platform, and automatically configuring one or more storage devices within the platform as a RAID system having a particular RAID level, where the particular RAID level is selected based on the capability of the platform.

The method can include one or more of the following features. For example, the method can further include automatically determining whether the platform is a software-based storage platform or a hardware-based storage platform. The method can further include automatically determining whether the platform includes an external storage device.

Querying components of the platform can include determining whether a RAID controller exists within the platform. A software-based RAID system can be automatically configured if a RAID controller does not exist in the platform, and a hardware-based RAID system can be configured if a RAID controller does exist in the platform. The method can further include automatically determining the number of physical storage devices available within the platform. The platform can be automatically configured as a RAID level 1 platform if two storage devices are available. The platform can be automatically configured as a RAID level 5 platform if three storage devices are available. The platform can be automatically configured as a RAID level 5 platform with a hot spare storage device if more than three storage devices are available. Two or more physical storage devices can be automatically grouped together within the platform as a virtual storage device if more than three physical storage devices are available.

The details of one or more implementations are set forth in the accompanying drawings and the description below. Other features are apparent from the description and drawings, and from the claims.

DESCRIPTION OF DRAWINGS

Like reference symbols in the various drawings indicate like elements.

DETAILED DESCRIPTION

Several different RAID platforms exist. For example, a software-based RAID platform for managing the storage and retrieval of data from an array of disks can be included in a host computer's operating system. Software-based RAID systems are relatively inexpensive but can limit system performance because they require CPU resources from the host computer. Internal, hardware-based, RAID platforms offload the management of data storage and retrieval from the host computer's CPU to a dedicated RAID processor within the host system. Hardware-based RAID systems offer more robust fault-tolerant features and increased performance compared to software-based RAID systems, but the additional performance comes at a higher initial price. External hardware RAID platforms manage RAID operations by using an independent processor in a RAID controller that is external to the host computer system. External hardware RAID systems are independent of the host computer's operating system and can be used to build very high-capacity storage systems for high-end servers. Each RAID platform has different capabilities and can be configured in different ways to optimize performance for a user.

Figure 1:
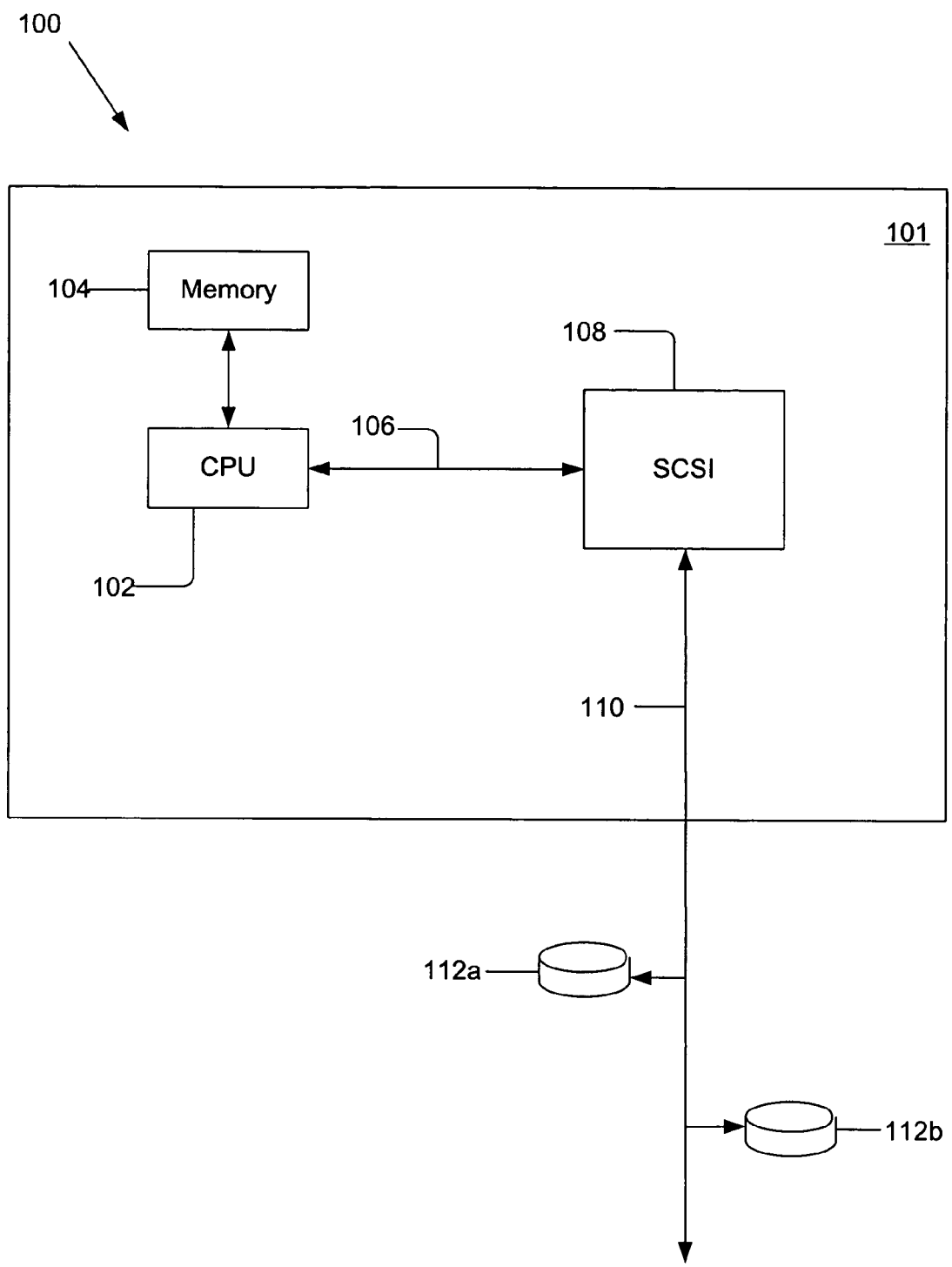
FIG. 1 is a schematic diagram of a software-based RAID storage platform.

As shown in FIG. 1, in a software-based RAID platform 100, a host system 101 can include a central processing unit (CPU) 102 and memory 104. A peripheral bus 106 connects the CPU 102 to a small computer system interface (SCSI) host card 108. The SCSI host card allows the CPU 102 to communicate on one or more SCSI channels 110 with data storage devices such as devices 112a and 112b (e.g., disk drives, tape drives, optical disk drives, flash memory, and random access memory). The peripheral bus 106 can be any type of peripheral bus, such as, for example, a peripheral component interface (PCI) bus, an industry standard architecture (ISA) bus, or an extended industry standard architecture (EISA) bus.

RAID algorithms built into the host system's operating system (e.g., Windows NT) allow CPU 102 to manage the storage of data among multiple storage devices. For example, Windows NT is a commonly used operating system that allows the implementation of RAID levels 0, 1, and 5.

In the software-based platform, RAID level 1 is often used for smaller critical data volumes because it provides complete fault tolerance yet is not overwhelmed by storage requirements. At least two disks are required to provide the disk mirroring capability of RAID level 1. For larger data volumes, RAID level 5 is commonly used to provide fault-tolerant disk volumes because it offers a reasonable compromise between performance and disk capacity. At least three drives are necessary to provide a RAID level 5 system, with one drive being allocated for the storage of parity data. When three disks are used, 33 percent of the total data storage space is sacrificed to maintain parity data. However, as more drives are added to the array, a smaller percentage of storage space is lost.

The locations of the disks 112 in the disk array can affect system performance in a software-based RAID system. If disks are striped on two or more SCSI channels 110, the operating system running the RAID algorithm must determine where to route data while also determining the striping and managing processor interrupts for handling multiple SCSI cards 108. Furthermore, in a software-based RAID level 5 system, an existing disk array cannot be broken to add a new drive to the array. In contrast, hardware-based RAID systems permit the insertion of a new drive into an array.

Figure 2:
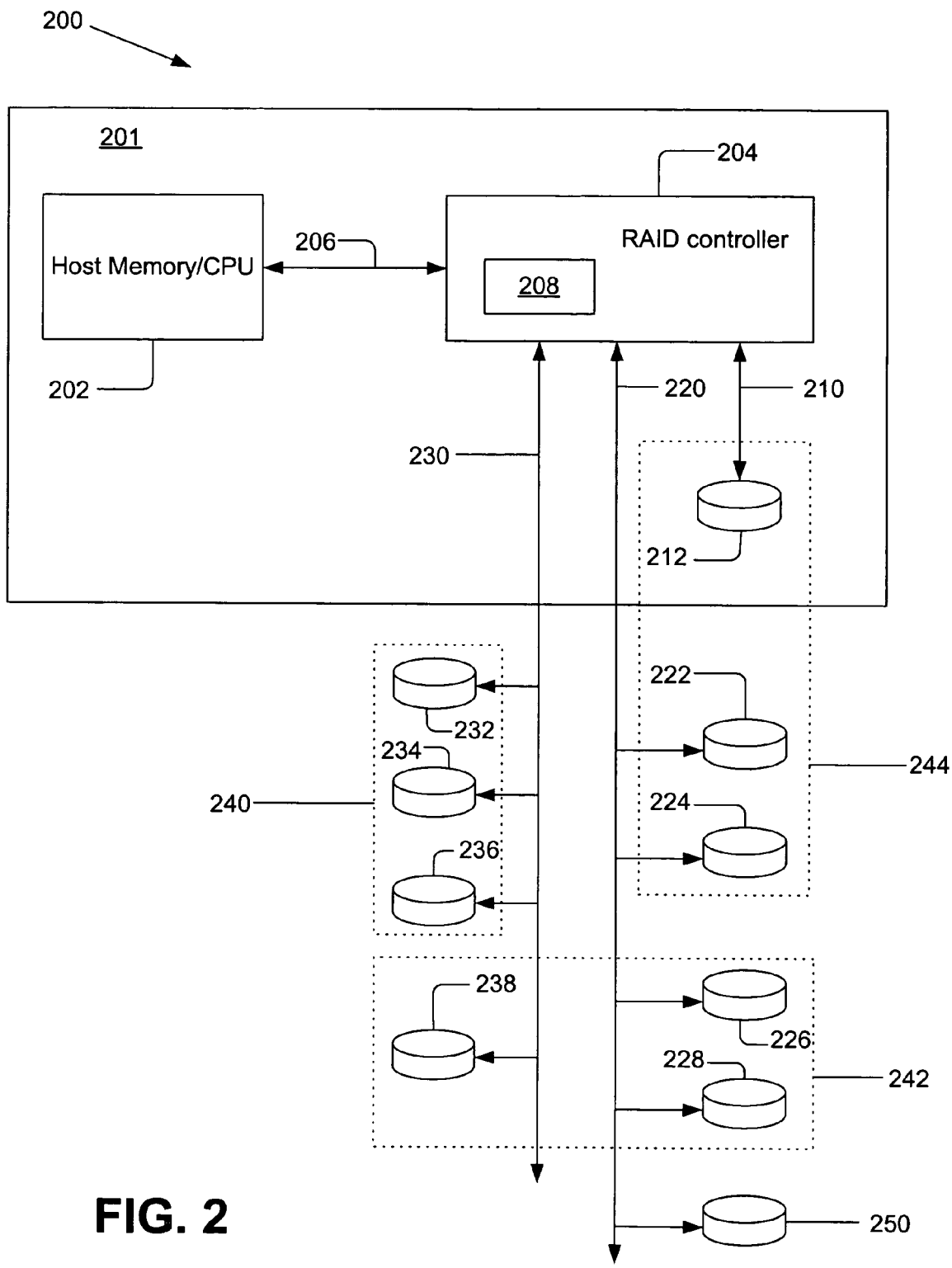
FIG. 2 is a schematic diagram of a hardware-based RAID storage platform.

As shown in FIG. 2, in a hardware-based RAID system 200, a host system 201 includes a memory and CPU module 202 that communicates with a RAID controller 204 through a peripheral bus 206. RAID controller 204 includes its own on-board processor and memory module 208 for managing RAID operations. RAID controller 204 can communicate with storage devices 212, 222, 224, 226, 228, 232, 234, 236, 238, and 250 through SCSI channels 210, 220, and 230. Individual storage devices can be grouped together to create a single virtual disk (also known as a logical disk or a logical drive) that is visible to the host computer's operating system. For example, three external disks 232, 234 and 236 can be grouped together to create a virtual disk 240 that is visible to the operating system and that is accessible to the host system 201 through SCSI channel 230. External disks 226, 228 and 238 can be grouped together to create a virtual disk 242 that is accessible to the host system 201 through SCSI channels 220 and 230. An internal hard disk boot drive 212 can be grouped with external disks 222 and 224 to create a virtual disk 244 that is accessible to the host system 201 through SCSI channels 210 and 220.

A hardware-based RAID system 200 typically can be configured as a RAID level 0, 1, 0/1, or 5 system, although other RAID levels are also possible. High-end, hardware-based RAID systems usually can be configured additionally as RAID level 3 systems. As opposed to a software-based RAID system 100, a hardware-based RAID system 200 permits the boot disk drive 212 to be configured as part of the RAID system so as to prevent crashing of the entire hardware-based system 200 in the event that the boot drive 212 fails.

A hardware-based RAID system 200 also can be configured to use a hot spare disk drive 250 that can be swapped into one of the disk arrays that make up a virtual disk 240, 242, or 244 if one of the individual physical disks within the virtual disk fails. If an individual disk fails, the RAID controller 204 can automatically detect the failed disk, replace the failed disk with the hot spare 250, and reconfigure the array while the system 200 continues to run and to keep data available to users of the system 200. The hot spare disk 250, as well as optional additional hot spare disks (not shown), can be made available as a spare to all disk arrays 240, 242, and 244 of the RAID system 200. Alternatively, each disk array 240, 242, or 244 may include a dedicated hot spare disk in order to minimize competition for a spare disk in the event of multiple individual disk drive failures among the virtual disks 240, 242, 244 in the system 200.

Figure 3:
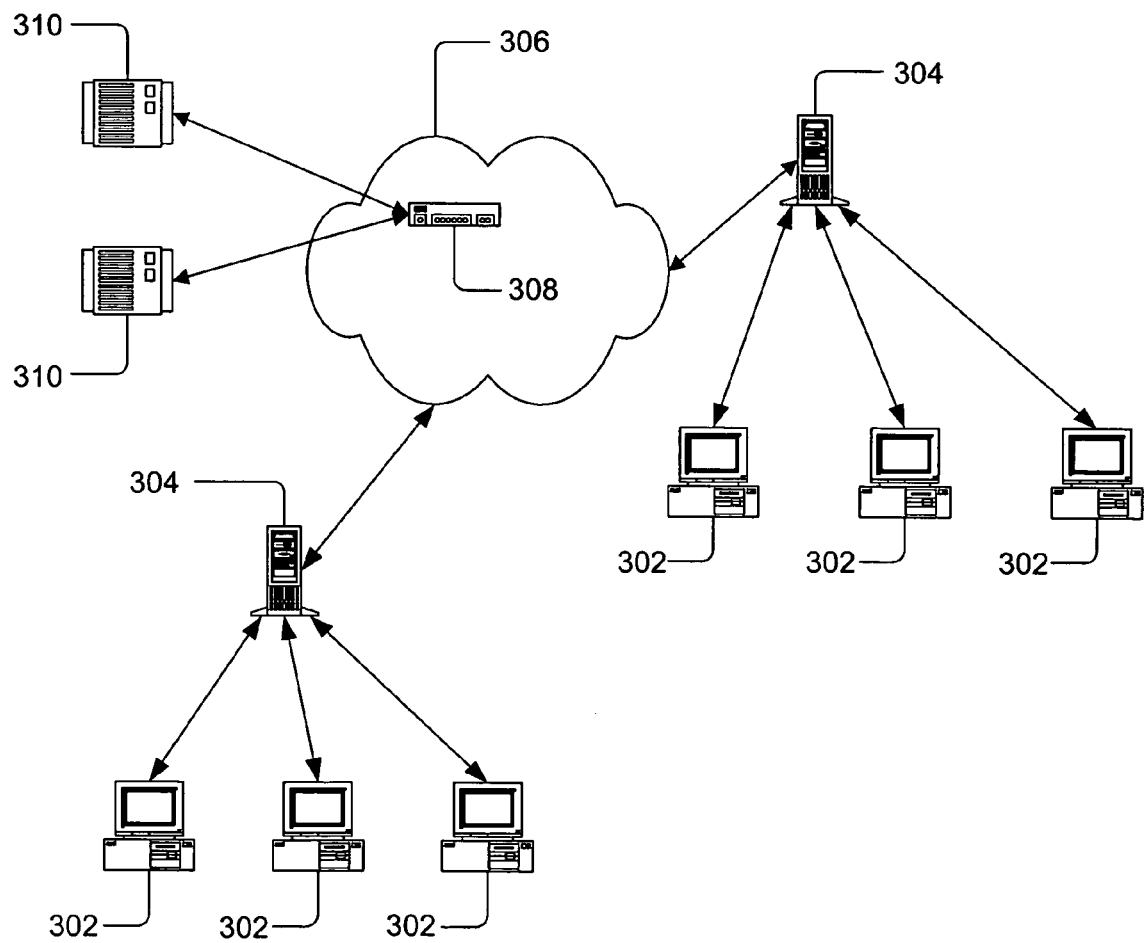
FIG. 3 is a schematic diagram of an external, hardware-based RAID storage platform in a networked computing environment.

As shown in FIG. 3, a high-end, hardware-based RAID storage platform for a network system includes several client systems 302 in communication with several host/server systems 304. The host/server systems 304 are connected to a network 306 that includes a storage control box 308 that groups multiple hard disks within physical disk arrays 310 into one or more RAID virtual disks that are visible to the operating system of one of the client systems. The storage control box 308 uses access control to grant servers 304 access to the virtual disks created from the disk arrays 310.

Figure 4:
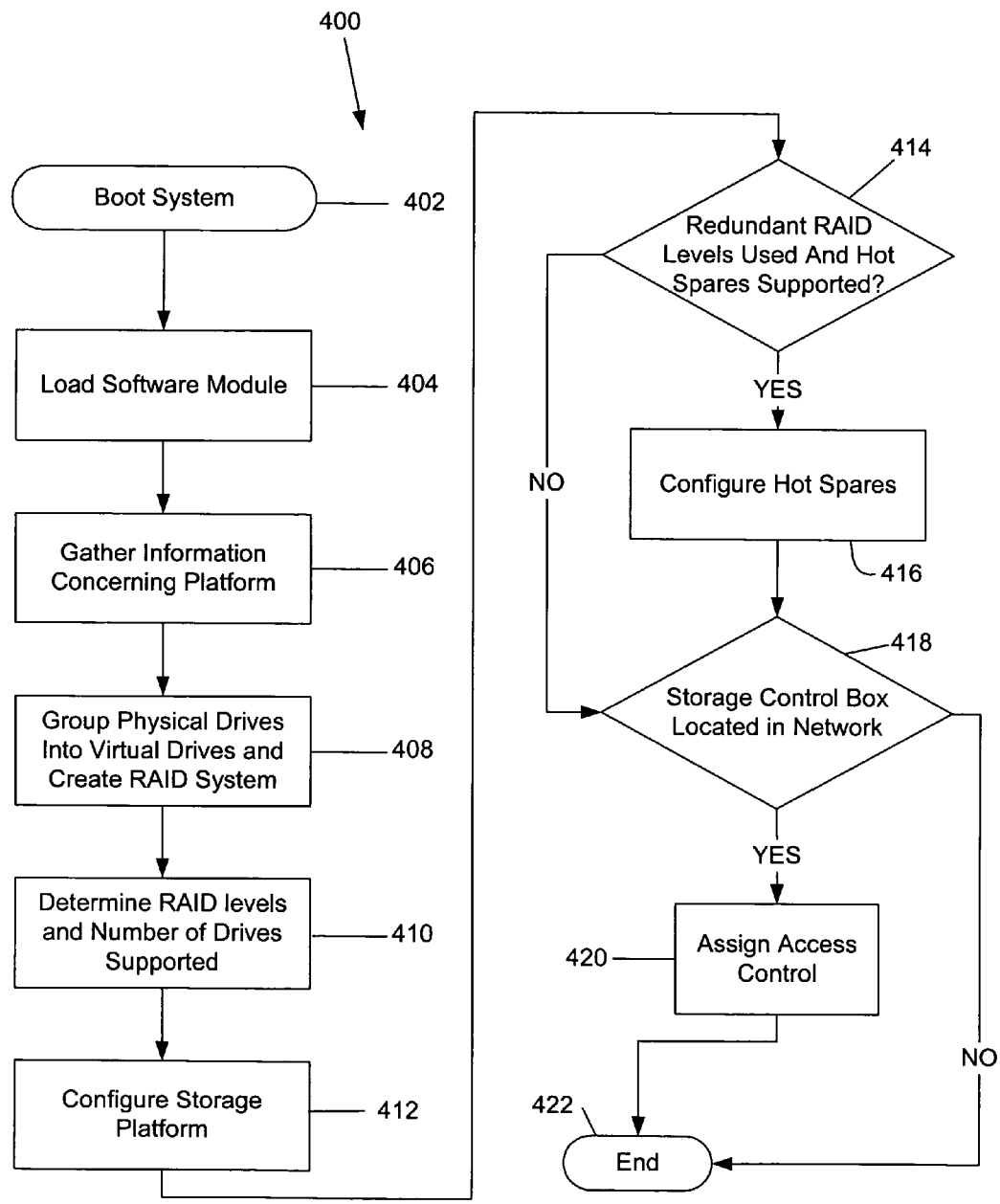
FIG. 4 is a flow chart of a process for detecting and configuring a storage platform.

Referring to FIG. 4, a procedure 400 for automatically detecting and configuring a RAID storage platform can be implemented by a software module that resides on a host system of a storage platform. The host system on which the software module resides is booted (step 402), and the module is loaded into memory of the host system (step 404).

After the module is loaded, the module queries components of the storage platform to gather information with which to make decisions concerning the configuration of a RAID implementation on the storage platform (step 406). As part of the query, the module gathers information about the components of the storage platform including how many disks are available for use in a RAID system, the storage capacity of each disk, and the SCSI channel to which each disk is connected. The query also determines if the storage platform supports segmentation (i.e., using segments of physical drives as distinct drives). The query also returns information concerning capabilities of the RAID controllers and SCSI cards present in the storage platform, such as, for example, how many logical drives can be supported by the controllers, whether the controllers and cards support access control for networked servers, whether the controllers and cards include a cache for caching read and/or write data sent from/to disks in the platform, and whether the controller and cards support the verification of data on the disk drives.

One verification method, which can be used in RAID level 5 systems, reads all the data on the drives in the array and resets the parity bit of the existing data sequentially from the beginning of the array to the end.

Information gathered during the query about hardware and software components of the storage platform is presented to the software module as part of a single object model. The object model includes parameters that provide information about the capabilities of both the physical objects (e.g., hard disks and the controllers) and virtual objects (e.g., the logical drives that can be configured) that exist in the storage system. For example, such information is gathered and presented to the software module concerning whether the controllers support arrays of multiple disks or the segmentation of an individual disk; how many arrays are supported by a controller; how many drives can be included in one array or how many segments a drive can have for a particular controller; what RAID levels are supported by the controller; whether hot spares are supported by the controller, and, if so, how many are supported; the maximum logical drive size that can be supported by a controller; the optimal stripe size for a logical drive; whether the controller has a battery-powered cache; and whether the controller supports a read cache on a logical drive of a hard disk.

Once the software module has received information about the storage platform, the software module can automatically configure the detected platform as a RAID system based on the parameters provided to the software module. First, the software module counts and groups the disk drives within the storage platform available for RAID to create virtual drives (step 408). For a typical hardware-based RAID system, a RAID controller can support up to eight drive groups (i.e., virtual disks) and each drive group can include up to eight physical drives. If the storage platform supports segmentation, the different segments are grouped.

The software module then determines the RAID levels supported by the platform and the maximum number of hard drives or segments that can be used with each supported RAID level (step 410). To do so, the software module uses information gathered concerning the number of available drives and the capabilities of the RAID controller to determine what RAID levels are supported by the platform. For example, if the information returned to the software module indicates that only two disks exist, then only a RAID level 0 or a RAID level 1 system can be configured. If three or more disks exist, then a RAID level 5 system can be configured.

The software module configures the storage platform with the highest RAID level virtual hard drives (RAID 5, followed by RAID 1, followed by RAID 0) up to the maximum virtual hard drives supported, with the maximum number of hard drives or hard drive segments in each virtual hard drive (step 412). Thus, if only two drives are available, the software module automatically configures a RAID level 1 system to provide redundancy in the data storage. The user has the option of overriding this auto-configured default setting and manually configuring a RAID level 0 system rather than a RAID level 1 system. If three or more disks exist, then a RAID level 5 system is configured. When a RAID level 0 system is configured, the size of data stripes is set at 64 KB. For RAID level 5, the stripe size is set at 64 KB if a write cache is enabled within a RAID controller of the storage system. If no write cache is enabled in the RAID controller, then the stripe size is set at 16 KB.

If redundant RAID levels are used and hot spares are supported (decision step 414), then the software module configures a hot spare drive (step 416). In general, for a RAID level 5 storage platform having more than three disks, a hot spare is created to provide protection against a drive failure. For a RAID level 5 system having only three disks, a spare cannot be created. Spares also cannot be created in software-based RAID platform. If three disk are available and a RAID level 1 system is configured, one of the three disks is used as a hot spare.

If the query locates a storage control box within a network environment of the storage platform (decision step 418), then access control by the storage control box is assigned to control access by the networked servers to the individual storage disks (step 420).

Finally, the process ends (step 422).

Figure 5:
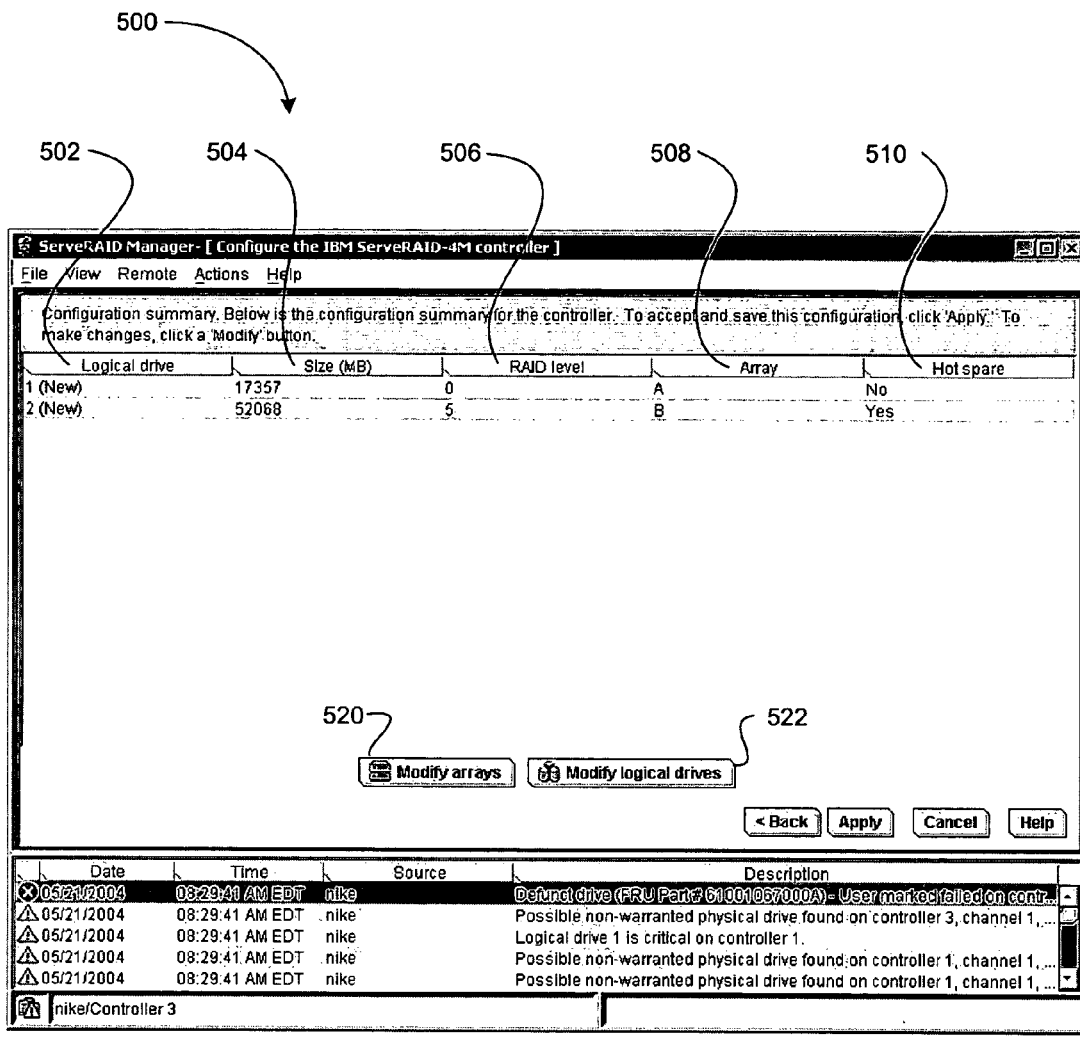
FIG. 5 is a screen shot of an auto-configuration program for a RAID system.

FIG. 5 illustrates a graphical user interface ("GUI") 500 of a software program (e.g., and installation wizard) for automatically configuring a RAID system. The GUI 500 displays information concerning the RAID systems that have been configured by the software module. For example, the GUI 500 displays information about the number of logical drives in an array created by the software module 502, the size of the logical drives in the array 504, the RAID level used chosen for the array 506, the name of the array 508, and whether the array includes a hot spare 510. Such information can be automatically determined by the software module that automatically configures the storage platform. Control buttons 520, 522 are included in the GUI 500 for manually overriding automatic configuration settings for the arrays 520 and for the logical drives in the array 522. For example, the number of logical drives that are automatically configured can be overridden when the user selects button 522 to open another GUI (not shown) through which the number of logical drives within the storage platform can be changed. Similarly, by selecting button 520, the user can open an additional GUI (not shown) though which automatically determined parameters for an array can be changed (e.g., the RAID level of an array can be changed or a hot spare can be added or deleted).

A number of implementations have been described. Nevertheless, it will be understood that various modifications may be made and are within the scope of the following claims.

What is claimed is:

1. A computer-implemented method of automatically configuring a platform of storage devices, the method comprising:

querying components of the platform to gather information about the capability of the platform;

identifying two or more storage devices within the platform that are capable of being configured as a RAID system;

automatically determining one or more RAID levels that are supported by the two or more identified storage devices; and automatically configuring the two or more identified storage devices as the RAID system having a particular RAID level including:
identifying a highest RAID level common to all of the two or more storage devices from the one or more determined RAID levels; and
setting the particular RAID level to the highest RAID level.

2. The method of claim 1, further comprising automatically determining whether the platform is a software-based storage platform or a hardware-based storage platform.

3. The method of claim 1, further comprising automatically determining whether the platform includes an external storage device.

4. The method of claim 1, wherein querying components of the platform includes determining whether a RAID controller exists within the platform.

5. The method of claim 4, further comprising automatically configuring a software-based RAID system if a RAID controller does not exist in the platform and configuring a hardware-based RAID system if a RAID controller does exist in the platform.

6. The method of claim 1, further comprising:
automatically configuring the RAID system as a RAID level 1 RAID system if two storage devices are identified as capable of being configured as the RAID system.

7. The method of claim 1, further comprising:
automatically configuring the RAID system as a RAID level 5 RAID system if three storage devices are identified as capable of being configured as the RAID system.

8. The method of claim 1, further comprising:
automatically configuring the RAID system as a RAID level 5 RAID system with a hot spare storage device if more than three storage devices are identified as capable of being configured as the RAID system.

9. The method of claim 1, further comprising:
automatically grouping together two or more identified storage devices as a virtual storage device if more than three storage devices are identified as capable of being configured as the RAID system.

10. The method of claim 1, further comprising:
receiving a user input defining a user-defined RAID level; and
overriding the RAID level set based on the highest RAID level with the user-defined RAID level.

11. A system comprising:
a processor;
a computer-readable medium operatively coupled to the processor and including instructions, which, when executed by the processor, causes the processor to perform operations comprising:
querying components of a platform to gather information about the capability of the platform;
identifying two or more storage devices within the platform that are capable of being configured as a RAID system;
automatically determining one or more RAID levels that are supported by the two or more identified storage devices; and
automatically configuring the two or more identified storage devices as the RAID system having a particular RAID level including:
identifying a highest RAID level common to all of the two or more storage devices from the one or more determined RAID levels; and
setting the particular RAID level to the highest RAID level.

12. The system of claim 11, wherein the computer-readable medium includes further instructions, which, when executed by the processor, causes the processor to further perform operations comprising:
automatically determining whether the platform is a software-based storage platform or a hardware-based storage platform.

13. The system of claim 11, wherein the computer-readable medium includes further instructions, which, when executed by the processor, causes the processor to further perform operations comprising:
automatically determining whether the platform includes an external storage device.

14. The system of claim 11, wherein querying components of the platform includes determining whether a RAID controller exists within the platform.

15. The system of claim 14, wherein the computer-readable medium includes further instructions, which, when executed by the processor, causes the processor to further perform operations comprising:
automatically configuring a software-based RAID system if a RAID controller does not exist in the platform and configuring a hardware-based RAID system if a RAID controller does exist in the platform.

16. The system of claim 11, wherein the computer-readable medium includes further instructions, which, when executed by the processor, causes the processor to further perform operations comprising:
automatically configuring the RAID system as a RAID level 1 RAID system if two storage devices are identified as capable of being configured as the RAID system.

17. The system of claim 11, wherein the computer-readable medium includes further instructions, which, when executed by the processor, causes the processor to further perform operations comprising:
automatically configuring the RAID system as a RAID level 5 RAID system if three storage devices are identified as capable of being configured as the RAID system.

18. The system of claim 11, wherein the computer-readable medium includes further instructions, which, when executed by the processor, causes the processor to further perform operations comprising:
automatically configuring the RAID system as a RAID level 5 RAID system with a hot spare storage device if more than three storage devices are identified as capable of being configured as the RAID system.

19. The system of claim 11, wherein the computer-readable medium includes further instructions, which, when executed by the processor, causes the processor to further perform operations comprising:
automatically grouping together two or more identified storage devices as a virtual storage device if more than three storage devices are identified as capable of being configured as the RAID system.

20. The system of claim 11, wherein the computer-readable medium includes further instructions, which, when executed by the processor, causes the processor to further perform operations comprising:
receiving a user input defining a user-defined RAID level; and
overriding the RAID level set based on the highest RAID level with the user-defined RAID level.

21. A computer-readable medium having instructions stored thereon, which, when executed by a processor, causes the processor to perform operations comprising:
querying components of a platform to gather information about the capability of the platform;

identifying two or more storage devices within the platform that are capable of being configured as a RAID system;

automatically determining one or more RAID levels that are supported by the two or more identified storage devices; and automatically configuring the two or more identified storage devices as the RAID system having a particular RAID level including:

identifying a highest RAID level common to all of the two or more storage devices from the one or more determined RAID levels; and setting the particular RAID level to the highest RAID level.

22. The computer-readable medium of claim 21, includes further instructions, which, when executed by the processor, causes the processor to further perform operations comprising:

receiving a user input defining a user-defined RAID level; and overriding the RAID level set based on the highest RAID level with the user-defined RAID level.

* * * * *